United States Patent [19]

Yoden

[11] Patent Number: 4,871,960
[45] Date of Patent: Oct. 3, 1989

[54] OUTPUT VOLTAGE CONTROL SYSTEM FOR AN ELECTRIC GENERATOR

[75] Inventor: Sadamitsu Yoden, Iida, Japan
[73] Assignee: Tamagawa Seiki Kabushiki Kaisha, Tokyo, Japan
[21] Appl. No.: 227,161
[22] Filed: Aug. 2, 1988
[30] Foreign Application Priority Data Aug. 21, 1987 [JP] Japan .................. 62-206450

[51] Int. Cl.$^4$ .............. H02P 9/10; H02P 9/14
[52] U.S. Cl. .................. 322/24; 322/32; 322/63
[58] Field of Search .......... 322/28, 32, 63-66, 322/24

[56] References Cited

U.S. PATENT DOCUMENTS 3,863,137  1/1975  Mishima et al. ............. 322/64 X
4,383,215  5/1983  Frister ..................... 322/28 X
4,446,417  5/1984  Fox et al. .................. 322/28 X Primary Examiner—R. J. Hickey
Attorney, Agent, or Firm—Brooks Haidt Haffner & Delahunty

[57] ABSTRACT

An output voltage control system for an electric generator having two field windings, wherein a rotary shaft of the generator is rotated by a power source such as an engine, for producing an output voltage. According to the invention, the control system includes a first control unit for supplying an electric current inversely proportionate to the output frequency of the generator to one of the field windings of the generator to produce a substantially constant output voltage for a stationay (fixed) load, and a second control unit for supplying an electric current derived from a portion of the output voltage produced at the generator output to the other of the field windings of the generator in the event of fluctuations in the generator load.

2 Claims, 1 Drawing Sheet

OUTPUT VOLTAGE CONTROL SYSTEM FOR AN ELECTRIC GENERATOR

BACKGROUND OF THE INVENTION

1. Field of the Invention

This invention relates to an output voltage control system for an electric generator and more particularly to an improvement in such system wherein, when the rotary shaft of the electric generator is connected to an engine or the like prime mover experiencing extremely severe fluctuations in r.p.m., the currents supplied to a pair of field windings are controlled in such a manner as to produce a substantially constant output voltage not only for a load subject to fluctuations but for a stationary (fixed) load.

2. Description of the Prior Art

Various different systems have been proposed for controlling the output voltage for the electric generator. One of such prior-art systems disclosed in an unidentified prepublication and put to practical usage extensively is shown herein in FIG. 1.

Referring to FIG. 1, an electric generator 1 has an output 2 to which is connected a stationary load 3.

The generator 1 has a rotary shaft having a rotor, not shown, which is connected to a power drive source, such as an engine, also not shown.

A rectifier 4 is connected to the output 2, and a portion of the d.c. voltage derived from the rectifier 2 is applied to a comparator-amplifier 6 to which a reference voltage is also supplied for comparison with the firstly stated voltage and a resulting control current is supplied to a field coil 7 of the electric generator 1.

The above described conventional output voltage control system for an electric generator operates in such a manner that the a.c. output obtained at the output 2 of the generator 1 is supplied to the stationary load 3 while it is also supplied to the comparator-amplifier 6 so that a control current proportionate to load fluctuations is supplied to the field coil 7 in such a manner that the output of the generator 1 is maintained at a substantially constant value despite load fluctuations.

The above described conventional control system is however inconvenient in that, although output voltage control can be made satisfactorily against load fluctuations, it is not possible to perform fine voltage control for a stationary load, for which a separate constant voltage circuit is required.

OBJECT AND SUMMARY OF THE INVENTION

It is therefore an object of the present invention to provide an output voltage control system for an electric generator wherein, in case the rotary shaft of the generator is connected to, for example, an engine for a vessel or an automobile experiencing extremely severe fluctuations in the number of revolutions per minute (r.p.m.), the control currents supplied to a pair of field windings are controlled in such a manner as to produce a constant output voltage for both the stationary load and load subjected to fluctuations.

In accordance with the present invention, there is provided an output voltage control system for an electric generator wherein a rotary shaft of the generator is rotated by power means, such as an engine, for producing an output voltage, wherein the control system comprises a first field winding, a second field winding and an output provided in the generator, a stationary load connected to the output, first control means adapted to supply an electric current inversely proportional to the output frequency of the generator to said first field winding to produce a substantially constant output voltage for said stationary load, and second control means adapted for supplying an electric current derived from a portion of the output voltage produced at the output to said second field winding for producing a constant output voltage in the event of load fluctuations in the electric generator.

In the present output voltage control system for the electric generator, an electric current inversely proportionate to the output frequency or the number of revolutions per minute of the generator is supplied to the first field winding, so that a substantially constant output voltage is supplied for a stationary load.

Also, since the electric current derived from a portion of the output voltage obtained at the output of the electric generator is supplied to the second field winding, a constant output voltage can be provided against load fluctuations and the portion of the fluctuations which could not be handled by the first control means.

Thus the first and the second control means make it possible to maintain an extremely stable constant output voltage for both the stationary load and load subjected to fluctuations.

In such a manner, control currents are separately supplied to a pair of field windings for a stationary load and a load subjected to fluctuations so that an effective control can be performed for both the stationary load and the load subjected to fluctuations with the result that a stable constant output voltage can be provided even in cases wherein the r.p.m. of the prime mover connected to the generator is increased or decreased drastically.

DESCRIPTION OF THE PREFERRED EMBODIMENTS

Figure 1:
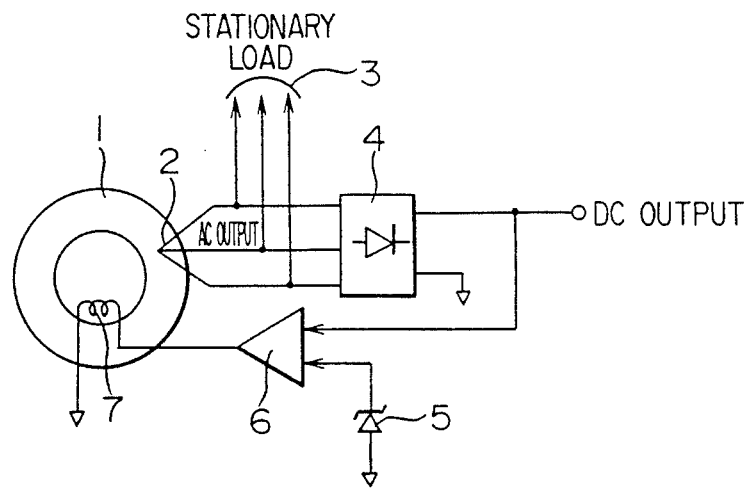
FIG 1 is a schematic block diagram showing an output voltage control system for an electric generator according to a conventional construction.

A certain preferred embodiment of the output voltage control system for an electric generator according to the present invention will be explained by referring to the drawing, wherein the parts that are the same as or equivalent to those of the conventional system shown in FIG. 1 are indicated by the same reference numeral.

Figure 2:
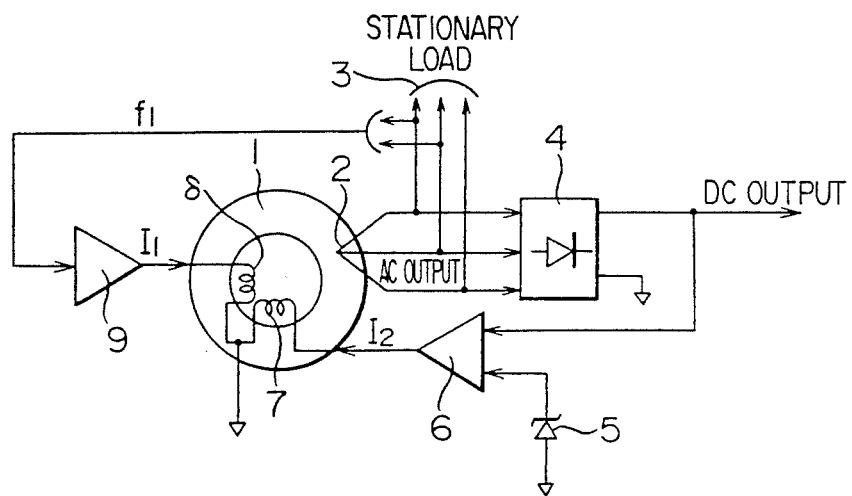
FIG. 2 is a schematic block diagram showing an output voltage control system for an electric generator according to the present invention.

In FIG. 2, the numeral 1 designates an electric generator having an output 2 to which is connected a stationary load 3.

The generator 1 has a rotary shaft having a rotor, not shown, which is connected to a power drive source, such as an engine, also not shown, so that the rotary shaft is subjected to extremely severe fluctuations in the number of revolutions.

A rectifier 4 is connected to the output 2, and a portion of the d.c. voltage derived from the rectifier 2 is applied to a comparator-amplifier 6 to which a reference voltage 5 is also supplied for comparison with the firstly stated voltage and a resulting control current is supplied to a field coil 7 of the electric generator 1.

The comparator-amplifier 6 and related circuit portions constitute second control means.

The generator 1 has a first field winding 8 to which is connected an amplifier 9 in turn connected to the output 2. The arrangement is so made that the electric current from the output 2 which is inversely proportionate to the output frequency, that is, the number of revolutions, of the electric generator 1 is controlled by the amplifier 9 before being supplied to the second field winding 8. The amplifier 9 and related circuit portions constitute first control means.

The above described output voltage control system for an electric generator according to the present invention operates in the following manner.

An electrical signal $f_1$ indicating the output frequency or r.p.m. of the electric generator 1 is obtained at the output 2 and supplied to the amplifier 9. An electric current $I_1$ proportionate to the output frequency is produced at the amplifier 9 and supplied to the first field winding 8 so that the current magnitude is lowered for a higher frequency and raised for a lower frequency.

Thus it is seen that a substantially constant output voltage is supplied for the stationary load free of load fluctuations by the first control means.

On the other hand, a compensating control current $I_2$ supplied from the comparator-amplifier 6 to the second field winding 7 becomes larger for higher load fluctuations and lesser for lower load fluctuations, thereby stabilizing the output voltage against load fluctuations.

What is claimed is:

1. An output voltage control system for an electric generator wherein a rotary shaft of the generator is rotated by power means, such as an engine, for producing an output voltage, said control system comprising a first field winding, a second field winding and an output provided in the generator, a stationary load connected to the output, first control means adapted to supply an electric current inversely proportionate to the output frequency of the generator to said first field winding to produce a substantially constant output voltage for said stationary load, and second control means adapted for supplying an electric current derived from a portion of the output voltage produced at the output to said second field winding for producing a constant output voltage in the event of load fluctuations in the electric generator.

2. The control system according to claim 1 wherein said second control means includes a differential amplifier provided with a predetermined reference voltage.

* * * * *